US006574612B1

United States Patent
Baratti et al.

(10) Patent No.: US 6,574,612 B1
(45) Date of Patent: Jun. 3, 2003

(54) LICENSE MANAGEMENT SYSTEM

(75) Inventors: Paolo Baratti, Rome (IT); Paolo Squartini, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/342,555

(22) Filed: Jun. 29, 1999

(30) Foreign Application Priority Data

Feb. 19, 1999 (GB) ............................................ 9903798

(51) Int. Cl.$^7$ .............................................. G06F 17/60
(52) U.S. Cl. .......................................... 705/59; 713/167
(58) Field of Search ................................ 705/1, 35, 51, 705/59, 55; 702/35; 380/201, 280, 202, 277, 283; 713/165, 167

(56) References Cited

U.S. PATENT DOCUMENTS

| 5,671,412 A | * | 9/1997 | Christiano | .................. 395/615 |
| 6,047,242 A | * | 4/2000 | Benson | ......................... 702/35 |
| 6,343,280 B2 | * | 1/2002 | Clark | ........................... 705/55 |

FOREIGN PATENT DOCUMENTS

| GB | 2 236 604 A | 4/1991 | ............. G06F/1/00 |
| GB | 2236604 A | * | 10/1991 | |

OTHER PUBLICATIONS

Software License Management in a Network Environment; French A. H. et al,; 1988.*
UNIX Review vol. 6, No. 9, Sep. 1988, M Olson et al., "Concurrent access licensing", pp. 67–72, and also DIALOG Accession No. 01254918.

* cited by examiner

Primary Examiner—Pierre E. Elisca
(74) Attorney, Agent, or Firm—Edward H. Duffield

(57) ABSTRACT

A method and system for providing flexibility to a license management system. A license management system permits the concurrent use of n copies of a software program over a network comprising a plurality of client workstations, each client workstation having a copy of the software program installed thereon requiring an authorization from one of a plurality of S license servers each time the software program is used. For security reasons, the license management system requires that at least the integer majority of the plurality of license servers is active at any time. The method and system allow to change the number of license servers, but impose the following limit: taken s1 and s2 respectively as the minimum and the maximum number of servers that may belong to the cluster, the sum of the integer majority of s1 and of the integer majority of s2 must be strictly greater than s2.

13 Claims, 7 Drawing Sheets

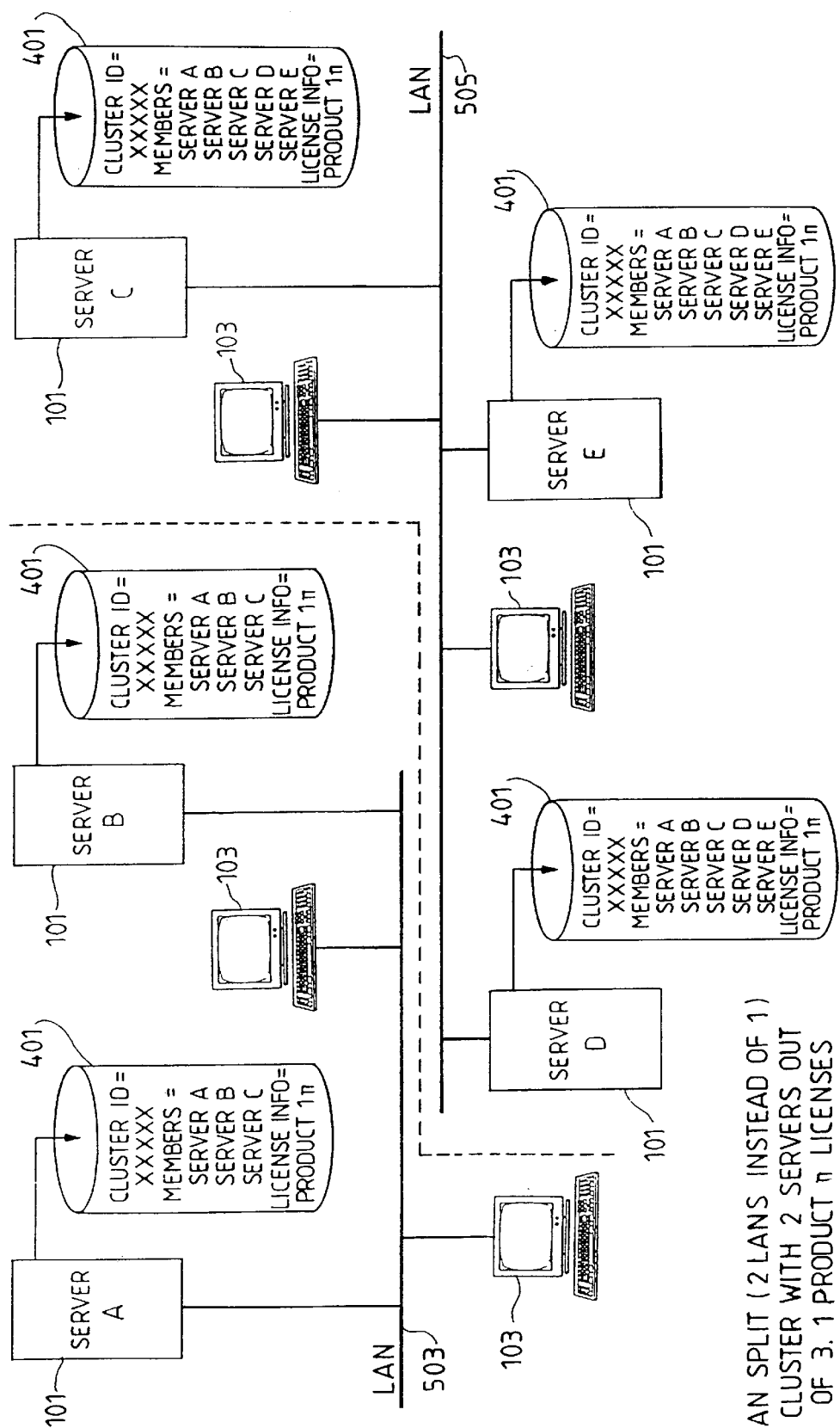

LICENSE MANAGEMENT SYSTEM

FIELD OF THE INVENTION

The present invention relates to license management systems and particularly to a method and system for providing flexibility to a license management system.

BACKGROUND OF THE INVENTION

The licensing of computer software was traditionally accomplished by providing a copy of the software and a license for each computer which was authorized to use the software. The software could be generally used only on that computer, unless it was deleted from that computer and transferred to another one together with the license. With the advent of wide spread computer networks a more efficient solution was required. A license management system allows a user to install a copy of a software program on N nodes of a network, but acquire only a limited number n licenses, where at any time, only the maximum number n copies of that program can be simultaneously run on the network. When all the available licenses are allocated, additional users requesting the use of that software must wait for a license to become available. This kind of license management system has a number of advantages for both the software vendor and the user, because it allows the user to purchase all and only the licenses really needed and, on the other hand, allows the vendor to fight software piracy.

An example of a state of the art license management system available on the market, is the License Use Management product of International Business Machines Corporation.

In a typical network of interconnected computers with a license management system, as illustrated in FIG. 1, one or more of the nodes 101 act as license servers, while a plurality of nodes 103 act as clients of the license servers. The service provided by a license server 101 to its client 103 is that of granting or denying permission to run a given software program, according to the availability of a license record in the license server data base, and to the terms and conditions encoded in the license record itself. The license server usually creates and stores license records in the license data base upon processing license certificate files, which are provided by the software vendor and complement the software program to which they are related. This license data base must be locked in some way to the specific instance of the license server (hardware+software) to prevent malicious users from copying the license data base to another license server machine and multiplying by two the number of licenses for all the software products contained in the license data base. License certificate files may contain some encryption or checksum information that allow the license server to verify their authenticity and integrity.

The fact that a license management system is monitoring the use of a given software program should be as transparent as possible to the users of that software program whereas it should be evident and beneficial to the administrator of licenses for that and other software programs. This consideration places a strong requirement on the license management system in terms of reliability and performance. The ideal license management system should be one which never causes software program failures because of its outage nor becomes a bottleneck for the software programs that it monitors.

In a license management system, "availability" is a measure of the degree to which the system can process and satisfy incoming requests (either granting or denying permission to run) within the time limits set by the served environment. High availability systems attempt to provide a continuous service within a particular operational window by minimising causes of failure and minimising recovery time when failures occur. Usually this requires a large degree of redundancy in system components, so that the continued operation of the entire system is protected from failure of any single component. The ultimate objective is to eliminate all single points of failure in the system. This can be accomplished by having redundant components or systems, and "availability management technology" that can automate the transfer of services to those redundant components when a failure occurs. Availability is a crucial feature of license management systems, since an outage of one or more license servers of a license management system can prevent many users from running their critical applications, due to a failure to acquire a license. An obvious solution to ensure good availability would be to use well known clustering techniques. In the network data processing field, a cluster is a set of independent processors (nodes), connected over the network. A cluster constitutes a sort of "black box" which provides certain services to end users. Like any ideal black box system, the end users do not need to know which node in the cluster they are connecting to. However, common clustering techniques, aimed at increasing the overall availability of the system through server redundancy, cannot be applied in a straightforward way to license management systems because of the secure nature of the license serving environment. A redundant license server cannot simply take over the amount of licenses, served by another failing server; it must also ensure that, in no circumstances, the total number of licenses concurrently served can exceed the total number of available licenses, stored into the license authorization record.

Solutions to this problem, based on a method called "majority" or "quorum", are known, in which a certain number of license servers are configured to work cooperatively. As long as the majority of those servers is up and running and communicating with each other, all licenses are available, whereas as soon as the number of active license servers becomes less than the majority, all of the servers stop serving licenses. All existing solutions do not allow flexibility in the number of license servers that participate in the cluster. This number is either fixed by the licensing system vendor or can be chosen upfront by the user when configuring the system, but it is not possible to increase or decrease the number of license servers in the cluster, during the life-cycle of the cluster itself. Having the possibility of adding and removing license servers to and from a cluster is an important feature to ensure the required flexibility for adapting the system capacity to the changing demands of the application environment.

In theory flexibility could be provided, for example, by binding the license authorization key to a software based, random generated, binary identifier that can be securely stored into the license server's data base instead of binding them (the license key) to some specific license server hardware-based identifier. The same software-based binary identifier can be shared by all license servers participating in the cluster. However providing such a flexibility without any limitations on the way license servers can be added or removed from the cluster breaks the security of the license management system.

It is an object of the present invention to alleviate the above drawbacks of the prior art.

SUMMARY OF THE INVENTION

According to the present invention, we provide, in a network comprising a plurality of client workstations having a software program installed thereon, and a cluster comprising an initial plurality of S license servers, a license management system for allowing the concurrent use of a maximum number n of copies of the software program, each client workstation requiring an authorisation from one of the license servers for using the software program, the license management system requiring that at least the integer majority of the plurality of license servers in the cluster is active at any time, the license management system comprising:

means for allowing an increase or decrease in the number of license servers;

means for limiting the number of the plurality of license servers with respect to the initial number S so that the integer majority of the minimum number s1 of servers in the cluster plus the integer majority of the maximum number s2 of servers in the cluster is strictly greater than the maximum number s2 of servers in the cluster.

Furthermore, according to the present invention, we provide a method for providing flexibility to a license management system, the license management system permitting the concurrent use of n copies of a software program over a network comprising a plurality of client workstations, each client workstation having a copy of the software program installed thereon requiring an authorisation from one of a plurality of S license servers each time the software program is used, the license management system requiring that at least the integer majority of the plurality of license servers is active at any time, the method comprising the step of:

allowing an increase or decrease in the number of license servers;

limiting the number of the plurality of license servers with respect to the initial number S so that the integer majority of the minimum number s1 of servers plus the integer majority of the maximum number s2 of servers is strictly greater than the maximum number s2 of servers.

Also according to the present invention we provide a computer program product stored on a computer readable medium for allowing, in a network comprising a plurality of client workstations having a software program installed thereon, and an initial plurality of S license servers, the concurrent use of a maximum number n of copies of the software program, each client workstation requiring an authorisation from one of the license servers before using the software program, the computer program product requiring that at least the integer majority of the plurality of license servers is active at any time, the computer program product comprising:

computer readable program code means for allowing an increase or decrease in the number of license servers;

computer readable program code means for limiting the number of the plurality of license servers with respect to the initial number S so that the integer majority of the minimum number s1 of servers plus the integer majority of the maximum number s2 of servers is strictly greater than the maximum number s2 of servers.

BRIEF DESCRIPTION OF THE DRAWINGS

Various embodiments of the invention will now be described in detail by way of examples, with reference to accompanying figures, where:

FIGS. 5A-5C are an example of malicious use of the possibility of increasing the number of servers in the cluster.

DETAILED DESCRIPTION OF THE PREFERRED EMBODIMENT

Figure 1:
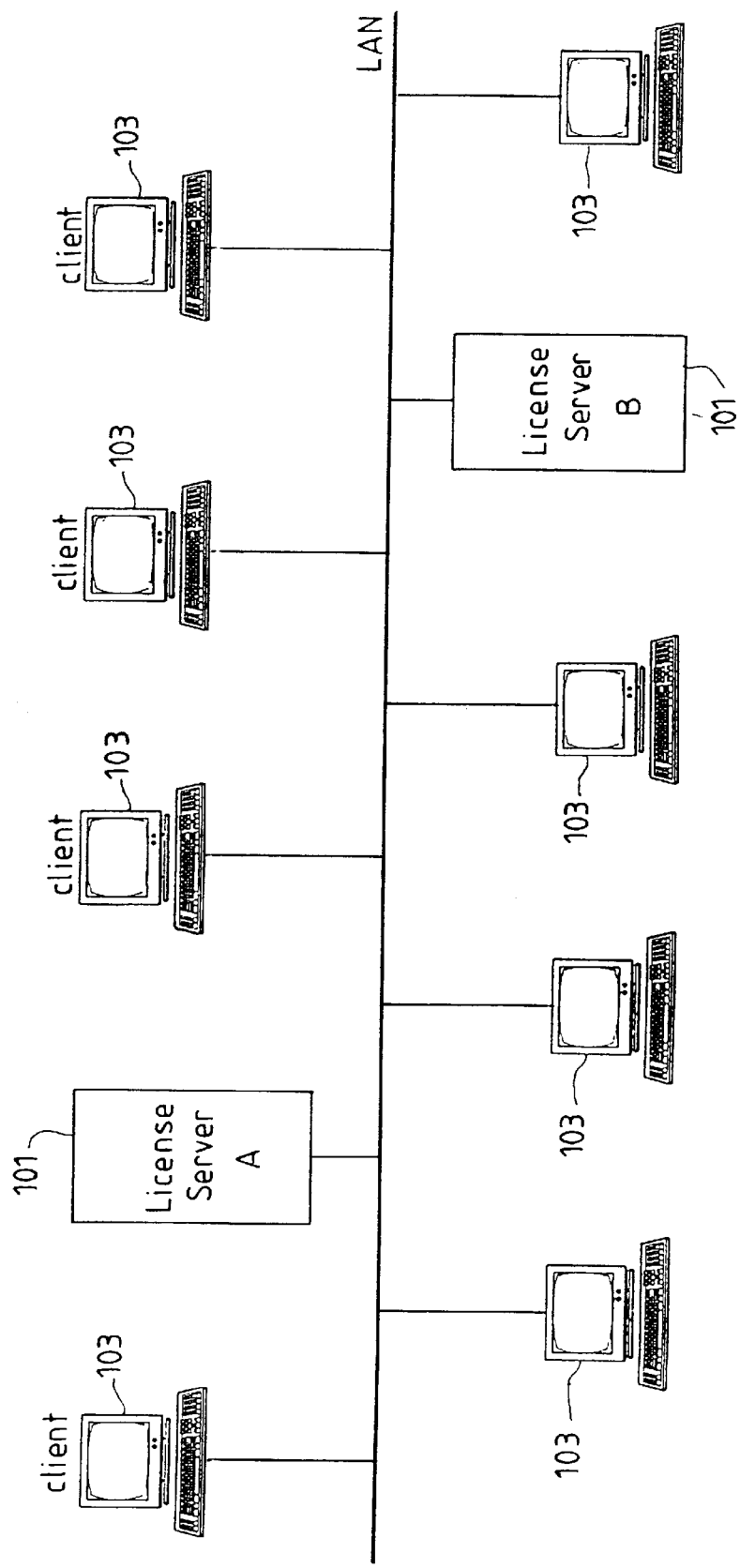
FIG. 1 shows schematically an example of a license management system.

As mentioned above, FIG. 1 represents a typical network (e.g. a Local Area Network) using a license management system which could implement the present invention. Servers 101 may be, for example IBM RISC System/6000 43P-140 produced by International Business Machines Corporation. Client nodes 103 could be any personal computer or workstation available on the market, e.g. IBM Personal Computer 300 GL produced by International Business Machines Corporation.

Figure 2:
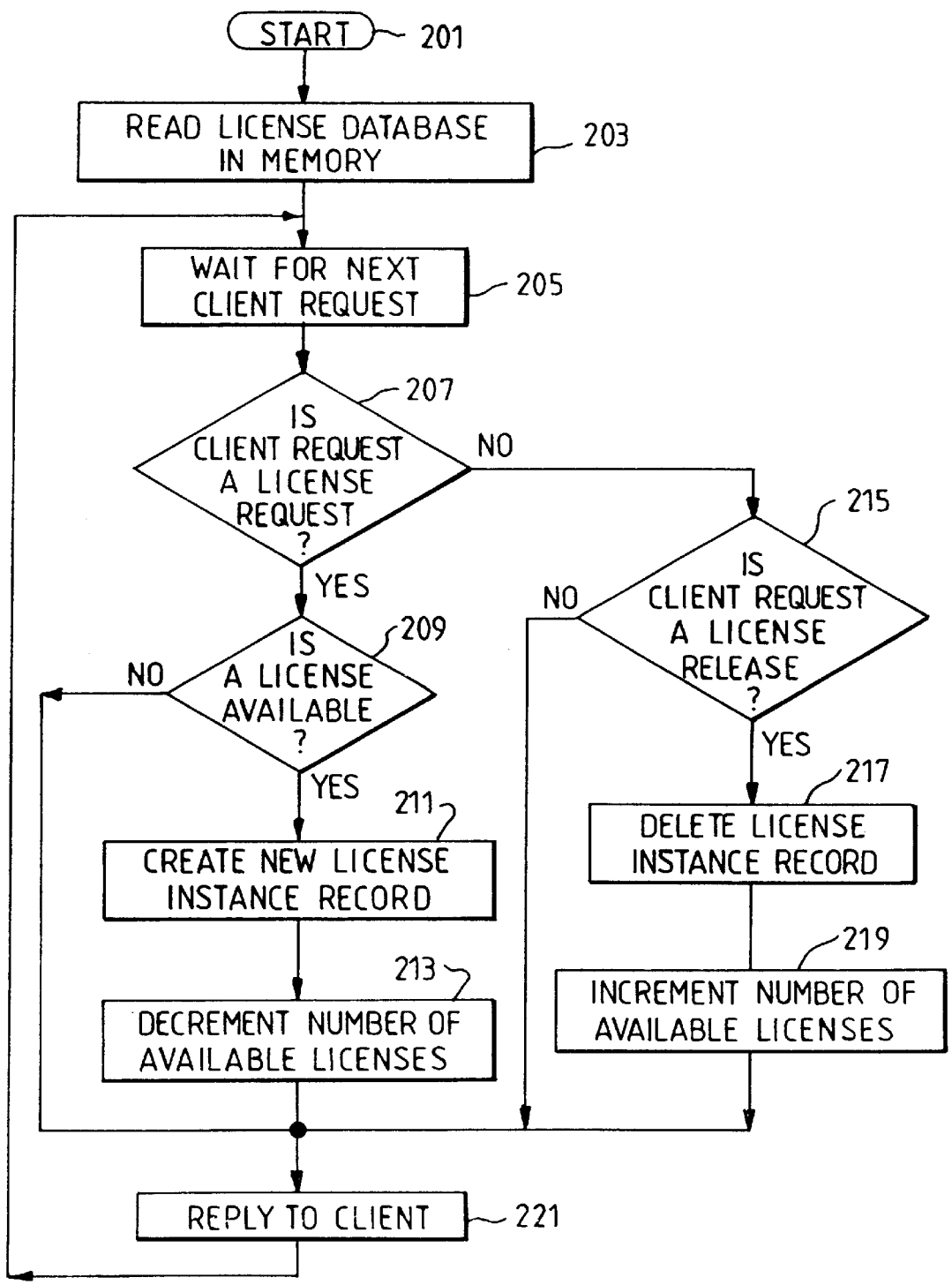
FIGS. 2 and 3 are diagrams showing the functioning of a license management system.
Figure 3:
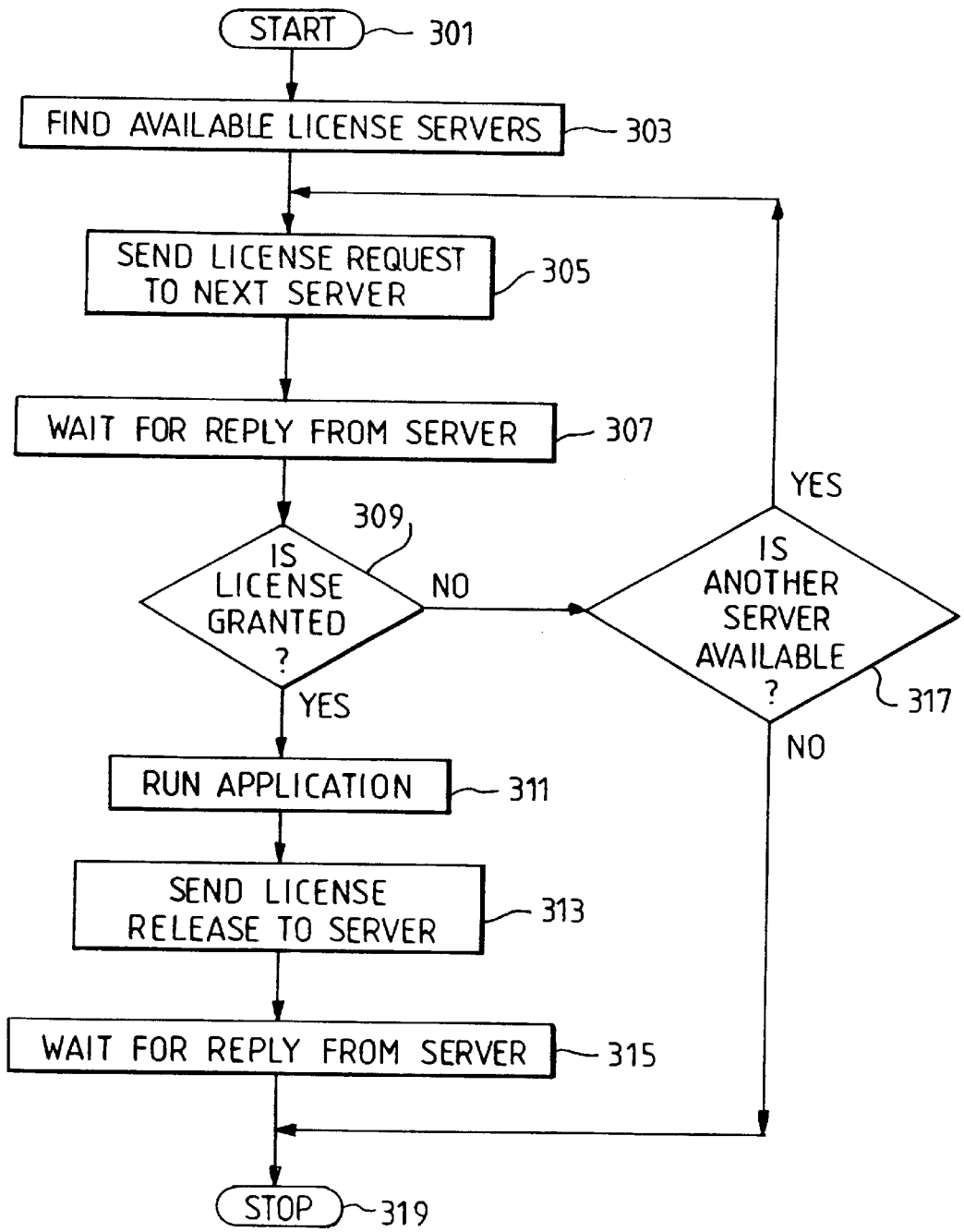

With reference to FIG. 2 and FIG. 3 the method of a license management system is described. FIG. 2 is a diagram of the method of functioning of a server according to a preferred embodiment of the present invention. The process starts at step 201 and goes straight to step 203 where the information about the software product to be licensed and the number of available licenses are read into the server memory. This information is usually provided by the software vendor and is usually protected against counterfeiting. When a request is received from a client (step 205) the server checks whether it is a request for a license (207). If this is the case and a license is available (209), the server creates a new license instance record (211) and decrements by one the number of available licenses. The server then sends a reply to the client (221) authorising the client to use the software product. Otherwise, if no more licenses are available the reply sent to the client (221) will be that the software product cannot be used. Going back to step 207, it may be the case that the client is requesting to release a license (215) after having used the software product. The server then deletes the correspondent license instance record (217) and increments the number of available licenses (219). With reference to FIG. 3 the functioning of a client wishing to use a software product is represented. When an available license server is found (303) a license request is issued to the server (305, 307). If the license is granted by the server then the client can use the software product (311), otherwise it is checked whether another server is available and control either goes back to step 305 or terminates the process. When the client finishes using the software application, a message is sent to the server which granted the license to release the license (313, 315).

Those skilled in the art will appreciate that a number of different method implementing similar license management procedures can be used instead of the one described above.

Figure 4:
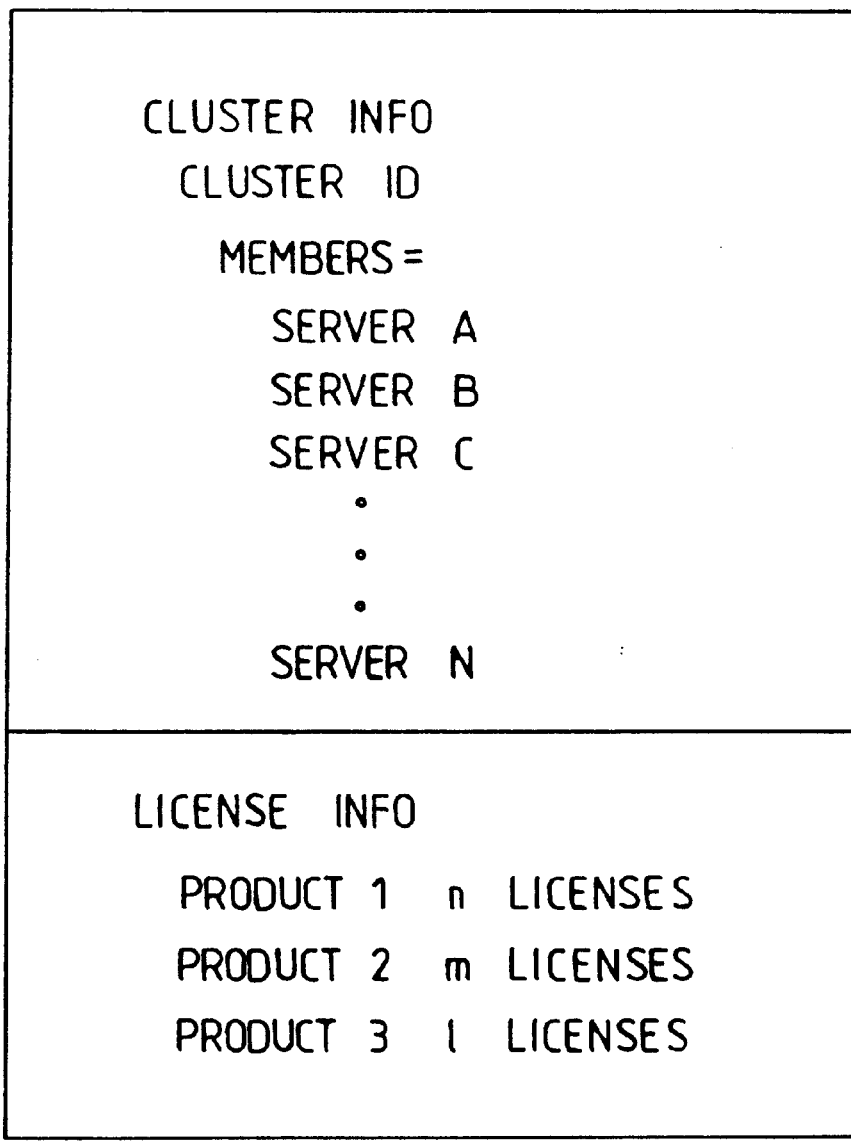
FIG. 4 is an example of a license data base according to a preferred embodiment of the present invention.

FIG. 4 shows an example of license data base 401, which, according to a preferred embodiment of the present invention, should be stored on each server 101. The information contained in this data base is:

the cluster ID;

the total number of servers belonging to the cluster;

the secure ID (possibly hardware-based) of each license server that has ever participated to the cluster;

the software products managed by the system;

the number of available licenses for each product.

Those skilled in the art will appreciate that a method to lock the above described data base to the server hardware and to ensure the security of the data base itself is needed. Furthermore those skilled in the art will appreciate that the above information could be organised in a number of different way according to well known programming techniques.

Figure 5A:
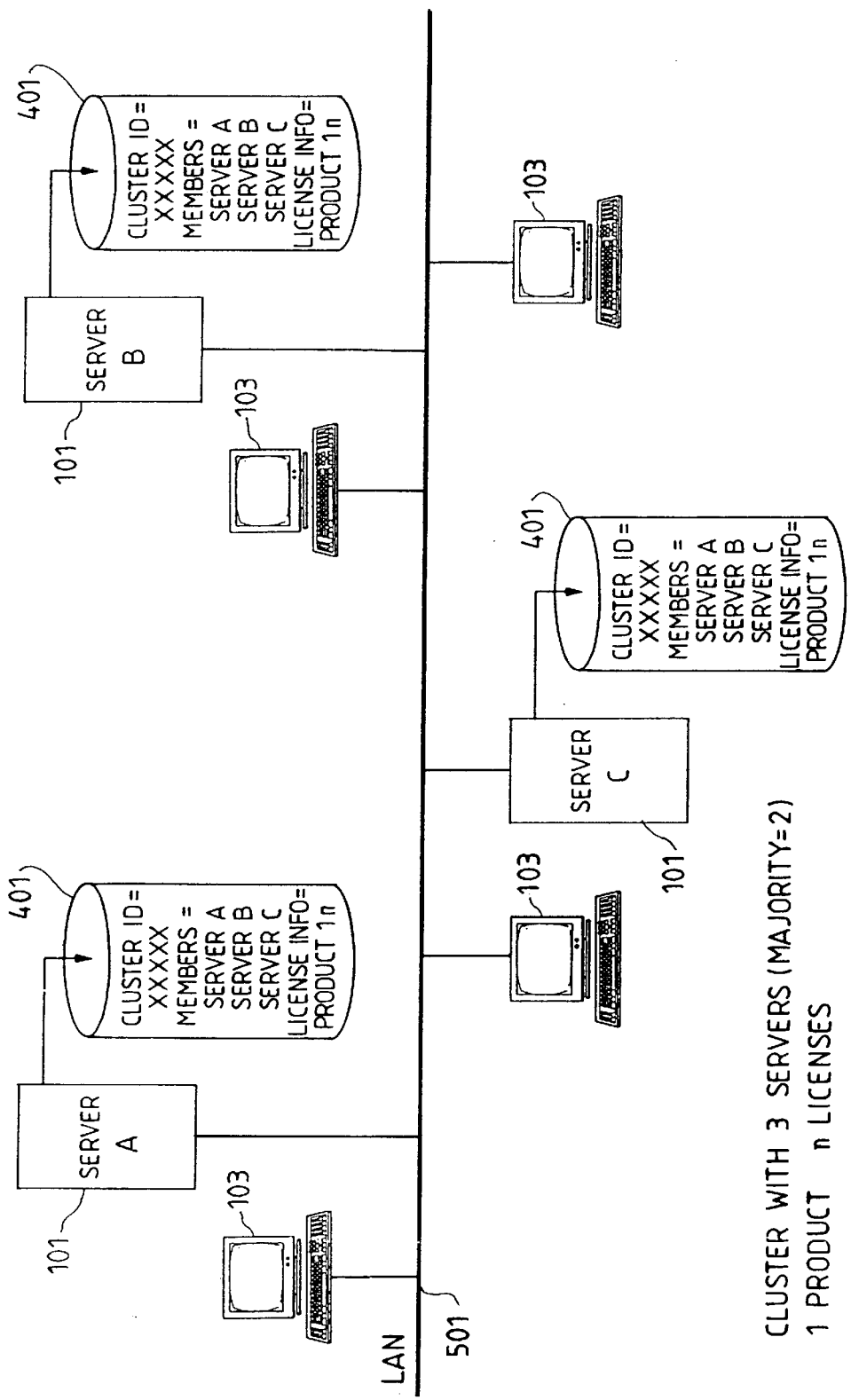

The network represented in FIG. 5a has three servers 101 serving a number n of licenses for software product 1 to a plurality of N clients 103. Each server 101 has a data base file 401 containing all the information described above. From the client point of view it does not make any difference whether a license is granted by server A, B or C. Any server 101 of the cluster can provide a license to any client 103. With such a system the failure of one of the servers would not be a problem, because the other two can do the service for all the clients. One of the servers could be inactive and act just as a backup server in case of failure of one of the other two. The limitation with such a configuration is that the majority of the servers (in this case two over three) must be always active, otherwise the system interrupts its services. Without this strict limitation the security of the system cannot be granted, because a malicious user could detach a server from the cluster, create another cluster and make believe to both clusters that they are still working in a three server cluster with, respectively one and two servers non-active. In this way the number of the possible licenses would be doubled. This protection mechanism is the "majority" requirement, well known by those skilled in the art.

A non limiting example of the system represented in FIG. 5a may be the following: a cluster of three servers serving 20 licences to 50 clients: the majority of the servers is two in this case, so at least two servers must be always active. Each of the server A and B manages 10 licenses each responding to the requests of the 50 clients, while server C stays non active. If one of the two active servers fails, then the server C takes over the licenses managed by that server and the service can continue without interruption and the majority rule is respected. Those skilled in the art will appreciate that a number of different implementations can be realised instead of the one described above, depending also from the requirements of the network.

Figure 5B:
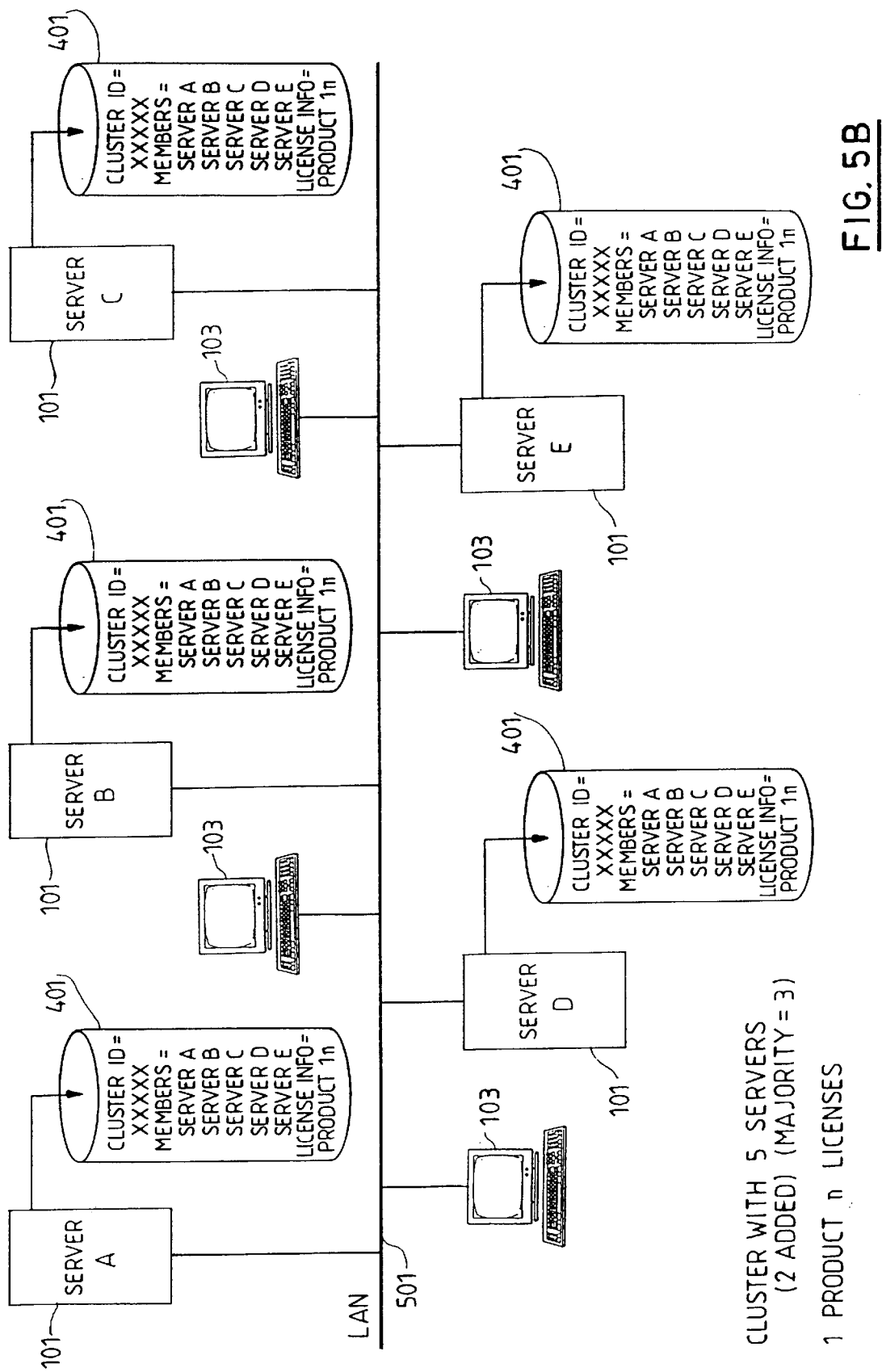

As mentioned above, a desirable feature of a license management system is the flexibility of adding or deleting servers to the server cluster, in case circumstances change. In the system described in FIG. 5a the number of servers could be easily increased as shown in FIG. 5b. In this new configuration the data bases 401 in each server 101 have been updated to reflect the new situation. Each server "knows" that there are five servers belonging to the cluster and that at least three servers must always be contemporarily active to ensure the security of the system.

However a system which allowed a change of configuration as the one described with reference to FIGS. 5a and 5b would be unsafe, and would not guarantee the respect of the maximum number of licenses available with consequent damage for the software vendor who authorised the use of only n concurrent licenses. A malicious user could bypass the security check and act as illustrated in FIG. 5c. The malicious user could make a backup copy of the data base 401 of FIG. 5a when the cluster included three servers. Then the number of servers are increased to five to arrive in the configuration of FIG. 5b, already described. At this point the malicious user splits the LAN 501 in two smaller ones not communicating with each other: one sub-LAN 505 including the three servers C, D and E; and a second sub-LAN 503 including the other two servers A and B. The sub-LAN 505 would continue its service because the Majority requirement is respected; each server believes that two servers are not active for some reason but, since the majority of servers is still available the service can be continued regularly by serving the n available licenses in the sub-LAN 505. The sub-LAN 503 would be interrupted, because the expected minimum number of three active server is not respected. However the malicious user restores the licensing environment, by substituting the data bases in sub-LAN 503 with the backup copies he made when the network was in the original configuration of FIG. 5a. At this point the two servers A and B erroneously believe they are in a cluster of three servers with two of them (the Majority) active and they serve all the n licenses in the sub-LAN 503. In this way the malicious user has duplicated the number of available licenses causing a loss to the software vendor.

According to a preferred embodiment of the present invention this unwanted security exposure is avoided, while still allowing flexibility, by imposing a limitation in the number of servers that can be added or removed by the original configuration.

If we take S as the initial number of licence servers, s1 and s2 respectively as the minimum and the maximum number of servers that may belong to the cluster, the limitation is the following: the sum of the integer majority of s1 and of the integer majority of s2 must be strictly greater than s2. In other words the following rule must be fulfilled:

$$M(s1)+M(s2)>s2;$$

with s1<=S and s2>=S and where M(x) is the integer majority of x

If the initial number S is odd the above rule is satisfied by limiting to 1 the number of servers that can be added or removed to the cluster.

If the initial number S is even the rule is satisfied if either maximum 2 servers are added to the cluster OR 2 servers are removed from the cluster. These two conditions are mutually exclusive: this means that the system administrator can chose either to increase the initial server number by one or two, or to decrease the initial number by one or two. Once the choice is done the initial number will be the minimum or the maximum limit respectively. As an example, once a server is removed from such a cluster, the initial number S becomes the maximum possible number of servers in the cluster and the only possible changes are to remove another server or to reintroduce the removed one. In a similar way if the first change to the number of servers in the cluster is an addition of another server, the initial number S becomes the minimum possible number of servers in the cluster and the only possible further changes are another addition or the removal of the initially added server.

EXAMPLE 1

Odd Initial Number S of Servers

In the case of the example described above, where the initial number S of servers in the cluster was 3, the maximum number of server that can be added to or removed from the cluster respecting the rule above is 1. In other words s1, as defined above, would be equal 2 and s2 would be equal 4 and the above rule would be satisfied, since:

$$M(2)+M(4)>4; \rightarrow 2+3>4.$$

EXAMPLE 2

Even Initial Number S of Servers

If the initial number S of servers in the cluster was 8 there are two possible solution satisfying the rule: s1=6, s2=8 or s1=8, s2=10, since:

$$M(6)+M(8)>8 \rightarrow 4+5>8$$

OR $$M(8)+M(10)>10 \rightarrow 5+6>10.$$

According to a preferred embodiment of the present invention, once a licence server has been added to the cluster, its unique identification is stored in the license data base of each server in the cluster and can never be deleted, unless the whole cluster and its identifier is deleted; this is to ensure that license servers cannot be replaced in the cluster. The license servers can only be added within the limits defined by the above rule and then deactivated to reduce the number of members of the cluster whose majority is to be up and running in order for the cluster to work. Once the limit specified above has been reached, no new server can be added to the cluster, but previously deactivated servers must be used. Allowing removal of license servers from the cluster or substitution would break the security of the cluster itself; for the same reason the unique ID of the license servers that initially form the cluster must be specified at cluster creation time. When a server is removed from the cluster (de-activated) this information is not lost, because the server is just marked as no longer active in the cluster. In this way, once the maximum number of servers is reached the whole set of servers that can ever be part of the cluster is definitely determined.

According to a preferred embodiment, to further increase the safety of the cluster, a minimum possible set must also be permanently determined. This minimum set is composed of the servers belonging to the cluster the first time the cluster reaches the minimum possible number of servers s1; thereafter, these core servers cannot be de-activated any longer. Further changes in the cluster configuration can be done only by operating on the previously de-activated servers. Thus, let us suppose an initial cluster of 5 servers A, B, C, D and E. Server E is then de-activated (i.e. removed from the cluster). A, B, C and D must permanently belong to the cluster and cannot be removed any more. Previously de-activated server E and new server F can be added to the cluster and all future changes can only relate to E and F without touching the core set A, B, C and D.

What is claimed is:

1. In a network comprising a plurality of license servers, a license management system for allowing a concurrent use of a maximum number n of copies of a software program, each client workstation requiring an authorisation from one of the license servers for using the software program, the license management system requiring that at least an integer majority of the plurality of license servers in the cluster is active at any time, the license management system comprising:

means for allowing an increase or decrease in the number of license servers;

means for limiting the number of the plurality of license servers with respect to an initial number S so that the integer majority of a minimum number s1 of servers in the cluster plus the integer majority of the maximum number s2 of servers in the cluster is strictly greater than the maximum number s2 of servers in the cluster; and wherein n, s1, s2 are positive integers.

2. The license management system of claim 1 wherein each license server is able to authorise the use of a portion of said maximum number n of concurrent copies of software program.

3. The license management system of claim 1 further comprising:

means for allocating to each server a unique ID, the maximum number of the IDs the system can allocate being s2;

means for locking the unique ID on each server;

means for storing on each license server the ID of every other license server.

4. The license management system of claim 3 further comprising:

means for tracking license servers which are removed;

means for preventing an addition of new servers once the maximum number of IDs that can be allocated has been reached.

5. The license management system of claim 4 further comprising:

means for identifying as core servers those servers belonging to the cluster, whenever the minimum number s1 is reached for the first time;

means for preventing a deletion of any of the core servers from the cluster.

6. A method for providing flexibility to a license management system, the license management system permitting a concurrent use of n copies of a software program over a network comprising a plurality of client workstations, each client workstation having a copy of the software program installed thereon requiring an authorisation from one of a plurality of S license servers each time the software program is used, the license management system requiring that at least a integer majority of the plurality of license servers is active at any time, the method comprising the step of:

allowing an increase or decrease in the number of license servers;

limiting the number of the plurality of license servers with respect to an initial number S so that the integer majority of a minimum number s1 of servers plus the integer majority of a maximum number s2 of servers is strictly greater than the maximum number s2 of servers; and wherein n, s1, s2 are positive integers.

7. The method of claim 6 further comprising the steps of:

allocating to each server a unique ID, the maximum number of the IDs the system can allocate being s2;

locking the unique ID on each server;

storing on each license server the ID of every other license server.

8. The method of claim 7 further comprising the steps of:

tracking license servers which are removed;

preventing an addition of new servers once the maximum number of IDs that can be allocated has been reached.

9. The method of claim 8 further comprising the steps of:

identifying as core servers those servers belonging to the cluster, whenever the minimum number s1 is reached for the first time;

preventing a deletion of any of the core servers from the cluster.

10. A computer program product stored on a computer readable medium for allowing, in a network comprising a plurality of client workstations having a software program installed thereon, and an initial plurality of S license servers, a concurrent use of a maximum number n of copies of the software program, each client workstation requiring an authorisation from one of the license servers before using the software program, the computer program product requiring that at least an integer majority of the plurality of license servers is active at any time, the computer program product comprising:

computer readable program code means for allowing an increase or decrease in the number of license servers;

computer readable program code means for limiting the number of the plurality of license servers with respect to the initial number S so that the integer majority of a minimum number s1 of servers plus the integer majority of the maximum number s2 of servers is strictly greater than the maximum number s2 of servers; and wherein, s1, s2 are positive integers.

11. The computer program product of claim 10 further comprising:

computer readable program code means for allocating to each server a unique ID, the maximum number of the IDs that can allocated being s2;

computer readable program code means for locking the unique ID on each server;

computer readable program code means for storing on each license server the ID of every other license server.

12. The computer program product of claim 11 further comprising:

computer program code means for tracking license servers which are removed;

computer program code means for preventing an addition of new servers once the maximum number of IDs that can be allocated has been reached.

13. The computer program product of claim 12 further comprising:

computer program code means for identifying as core servers those servers belonging to the cluster, whenever the minimum number s1 is reached for the first time;

computer program code means for preventing a deletion of any of the core servers from the cluster.

* * * * *